(12) United States Patent
Onitake et al.

(10) Patent No.: US 10,167,939 B2
(45) Date of Patent: Jan. 1, 2019

(54) DOG CLUTCH AND DIFFERENTIAL GEAR

(71) Applicant: JTEKT Corporation, Osaka-shi (JP)

(72) Inventors: Minoru Onitake, Kariya (JP);
Yasunori Kamitani, Fujimi (JP);
Motoyasu Yamamori, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 55 days.

(21) Appl. No.: 15/401,249

(22) Filed: Jan. 9, 2017

(65) Prior Publication Data

US 2017/0198800 A1     Jul. 13, 2017

(30) Foreign Application Priority Data

Jan. 13, 2016    (JP)  ................................ 2016-004253

(51) Int. Cl.
| | |
|---|---|
| *F16H 48/24* | (2006.01) |
| *F16D 11/14* | (2006.01) |
| *F16D 23/12* | (2006.01) |
| *F16D 27/09* | (2006.01) |

(52) U.S. Cl.
CPC ............ *F16H 48/24* (2013.01); *F16D 11/14* (2013.01); *F16D 23/12* (2013.01); *F16D 27/09* (2013.01); *F16D 2023/123* (2013.01)

(58) Field of Classification Search
CPC ..................................................... F16H 48/24
See application file for complete search history.

(56) References Cited

U.S. PATENT DOCUMENTS

| | | | |
|---|---|---|---|
| 6,945,895 B2* | 9/2005 | Fusegi ................... | B60K 23/04 180/247 |
| 2012/0252621 A1* | 10/2012 | Seidl ....................... | B60K 6/52 475/150 |

FOREIGN PATENT DOCUMENTS

| | | |
|---|---|---|
| JP | 2003-322240 | 11/2003 |
| JP | 2008-95711 | 4/2008 |
| JP | 2010-84930 | 4/2010 |
| JP | 2015-102185 | 6/2015 |

\* cited by examiner

*Primary Examiner* — Derek D Knight
(74) *Attorney, Agent, or Firm* — Oblon, McClelland, Maier & Neustadt, L.L.P.

(57) ABSTRACT

A dog clutch includes: a first rotational member; a second rotational member; a clutch member; and a pressing mechanism. The clutch member includes a meshing portion meshing with the second rotational member, an engageable portion circumferentially engaging with an engaged portion provided in the first rotational member, and a cam surface configured to generate a cam thrust in a direction of a rotation axis by a relative rotation with respect to the first rotational member. When the clutch member moves, a depth of meshing with the second rotational member is deepened by the cam thrust, and then the engageable portion engages with the engaged portion, so that the clutch member receives a torque from the first rotational member.

10 Claims, 5 Drawing Sheets

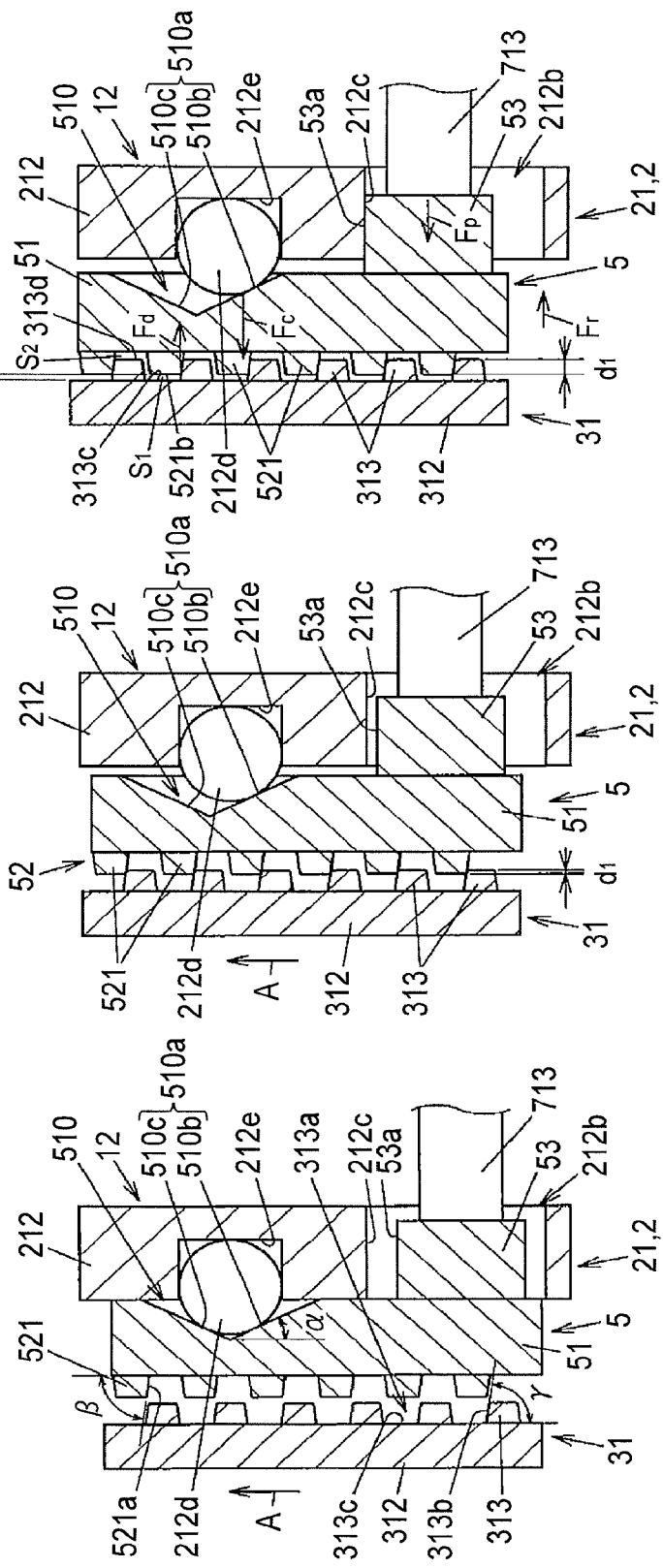

DOG CLUTCH AND DIFFERENTIAL GEAR

INCORPORATION BY REFERENCE

The disclosure of Japanese Patent Application No. 2016-004253 filed on Jan. 13, 2016 including the specification, drawings and abstract is incorporated herein by reference in its entirety.

BACKGROUND OF THE INVENTION

1. Field of the Invention

The present invention relates to a dog clutch that transmits a torque between rotational members by meshing, and a differential gear including the dog clutch.

2. Description of Related Art

Some differential devices (differential gears) that allow a differential action between right and left wheels of a vehicle and distribute a driving force thereto include a dog clutch that restricts a differential action between rotational members that are rotatable relative to each other (for example, see Japanese Patent Application Publication No. 2003-322240 (JP 2003-322240 A), Japanese Patent Application Publication No. 2008-95711 (JP 2008-95711 A)).

A differential device described in JP 2003-322240 A is placed on a front-wheel side of a four-wheel drive vehicle, and includes an outer differential case and an inner differential case rotatable relative to each other. A ring gear is fixed to an outer periphery of the outer differential case, and a pinion shaft is fixed to the inner differential case. A pair of pinion gears pivotally supported by the pinion shaft, and a pair of side gears meshing with the pair of pinion gears with their gear axes being at right angles are stored inside the inner differential case.

When a dog clutch is operated, a relative rotation between the inner differential case and the outer differential case is restricted, and when the dog clutch is not operated, the relative rotation is permitted. The dog clutch includes a plunger that moves axially upon receiving a magnetic force of an electromagnetic coil, and a clutch member pressed by the plunger. The clutch member integrally includes a plurality of fan-shaped leg portions, and a plurality of meshing teeth meshing with the inner differential case, and is biased by a return spring in a direction to be separated from the inner differential case. The plurality of fan-shaped leg portions of the clutch member is inserted into respective fan-shaped holes of the outer differential case. A circumferential end surface of the fan-shaped leg portion and an edge of the fan-shaped hole, the edge being opposed to the circumferential end surface are inclined with respect to an axis direction in parallel to each other. With this configuration, the fan-shaped hole of the outer differential case and the fan-shaped leg portion of the clutch member constitute a cam mechanism, and the clutch member receives a pressing force in a direction to mesh with the inner differential case, due to a thrust of the cam mechanism.

A differential device described in JP 2008-95711 A includes a disciform ring gear having an insertion hole through which an axle is passed, a differential case fixed to a side face of the ring gear, and a pair of pinion gears and a pair of side gears stored in the differential case. Further, the differential device described in JP 2008-95711 A includes, as a configuration to restrict a relative rotation of the ring gear and the differential case with respect to one side gear: an actuator having a motor; a fork-shaped operation metal fitting that axially moves by the actuator; an annular differential lock slider that axially moves together with the operation metal fitting; a clutch member that receives an operation force from the operation metal fitting via a pressing spring placed between the clutch member and the differential lock slider; and a plurality of ball members provided between a body portion of the ring gear and the clutch member. The ball member is partially stored in a bowl-shaped recessed portion provided in the body portion of the ring gear and also partially stored in a bowl-shaped recessed portion provided in the clutch member. A ball cam mechanism is constituted by the ring gear and the clutch member.

The clutch member is biased in a direction to be separated from one side gear by a return spring placed between the clutch member and a spring receiving portion of the differential case. Further, the clutch member integrally includes a plurality of meshing teeth meshing with one side gear, and a plurality of lock pins inserted into to a plurality of operation holes provided in the ring gear, respectively. A tip end of the lock pin is fitted slidably in a pin hole of the differential lock slider. When the operation metal fitting axially moves due to an operation of an actuator by a normal rotation of an electric motor, the clutch member is pressed against the side gear by the pressing spring, and the ball cam mechanism operates due to a relative rotation between the clutch member and the ring gear. Then, the clutch member is more strongly pressed against the side gear by a thrust of the ball cam mechanism, so that a plurality of meshing teeth of the clutch member meshes with the side gear.

As such, in the differential device described in JP 2008-95711 A, the clutch member is pressed against one side gear via the differential lock slider and the pressing spring due to the normal rotation of the electric motor, and the ball cam mechanism operates so that the clutch member meshes with the one side gear. Further, when the electric motor is reversed, the clutch member is separated from the one side gear, so that the clutch member is disengaged from the one side gear.

SUMMARY OF THE INVENTION

In the differential device described in JP 2003-322240 A, an inclination angle of the circumferential end surface in the fan-shaped leg portion of the clutch member is small. Accordingly, in order to apply, to the clutch member, a pressing force sufficient to mesh the clutch member with the inner differential case, it is necessary to use an electromagnetic coil that can generate a large magnetic force. Further, in a case where the inclination angle of the circumferential end surface of the fan-shaped leg portion is increased, it is necessary to increase a biasing force of the return spring to disengage the clutch member from the inner differential case. In order to move the plunger against the biasing force, it is also necessary to use an electromagnetic coil that can generate a large magnetic force. On this account, in the differential device configured as described in JP 2003-322240 A, it is necessary to use an electromagnetic coil that can generate a large magnetic force, which upsizes the device and increases power consumption.

Further, in the differential apparatus described in JP 2008-95711 A, the fork-shaped operation metal fitting is axially moved by the actuator including the electric motor that can perform a normal rotation and a reverse rotation. This upsizes the device and increases the number of components, which leads an increase in cost. Further, the thrust of the ball cam mechanism works to axially separate the ring gear from the differential case. Accordingly, it is necessary to increase strength of the ring gear and the differential case, which also upsizes the device.

In view of the above problems of the differential devices, the inventors of the present invention has conceived of an idea that these problems can be reduced by such a configuration that a clutch member is meshed with a rotational member by a thrust of a cam mechanism, and after the clutch member meshes with the rotational member, the thrust of the cam mechanism is restrained.

The present invention provides a dog clutch that can be downsized and a differential gear including the dog clutch.

A dog clutch according to a first aspect of the present invention includes: a first rotational member, a second rotational member placed rotatable relative to the first rotational member around a common rotation axis; a clutch member configured to transmit a torque between the first rotational member and the second rotational member; and a pressing mechanism configured to press and move the clutch member in a direction of the rotation axis. The clutch member includes a meshing portion meshing with the second rotational member due to a movement to the direction of the rotation axis, an engageable portion circumferentially engaging with an engaged portion provided in the first rotational member, and a cam surface configured to generate a cam thrust in the direction of the rotation axis by a relative rotation with respect to the first rotational member. When the clutch member moves in a direction to mesh with the second rotational member, a depth of meshing with the second rotational member is deepened by the cam thrust, and then the engageable portion engages with the engaged portion, so that the clutch member receives a torque from the first rotational member.

Further, a differential gear according to a second aspect of the present invention includes: the dog clutch; and a third rotational member rotatable relative to the first rotational member and the second rotational member around the rotation axis. In a state where the meshing portion of the clutch member does not mesh with the second rotational member, a torque input into the first rotational member is distributed to the second rotational member and the third rotational member while a differential action between the second rotational member and the third rotational member is allowed. When the meshing portion of the clutch member meshes with the second rotational member, a differential action of the first rotational member with respect to the second rotational member and the third rotational member is restricted.

According to the above aspects, it is possible to downsize the dog clutch and the differential gear.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5A is an explanatory view schematically illustrating an operation of a cam mechanism;

FIG. 5B is an explanatory view schematically illustrating the operation of the cam mechanism; and FIG. 5C is an explanatory view schematically illustrating the operation of the cam mechanism.

DETAILED DESCRIPTION OF EMBODIMENTS

An embodiment of the present invention will be described with reference to FIGS. 1 to 5C. Note that the embodiment described below shows one preferred concrete example on performing the present invention. There are some parts that specifically exemplify various technical matters that are technically preferable, but the technical scope of the present invention is not limited to such concrete examples.

Figure 1:
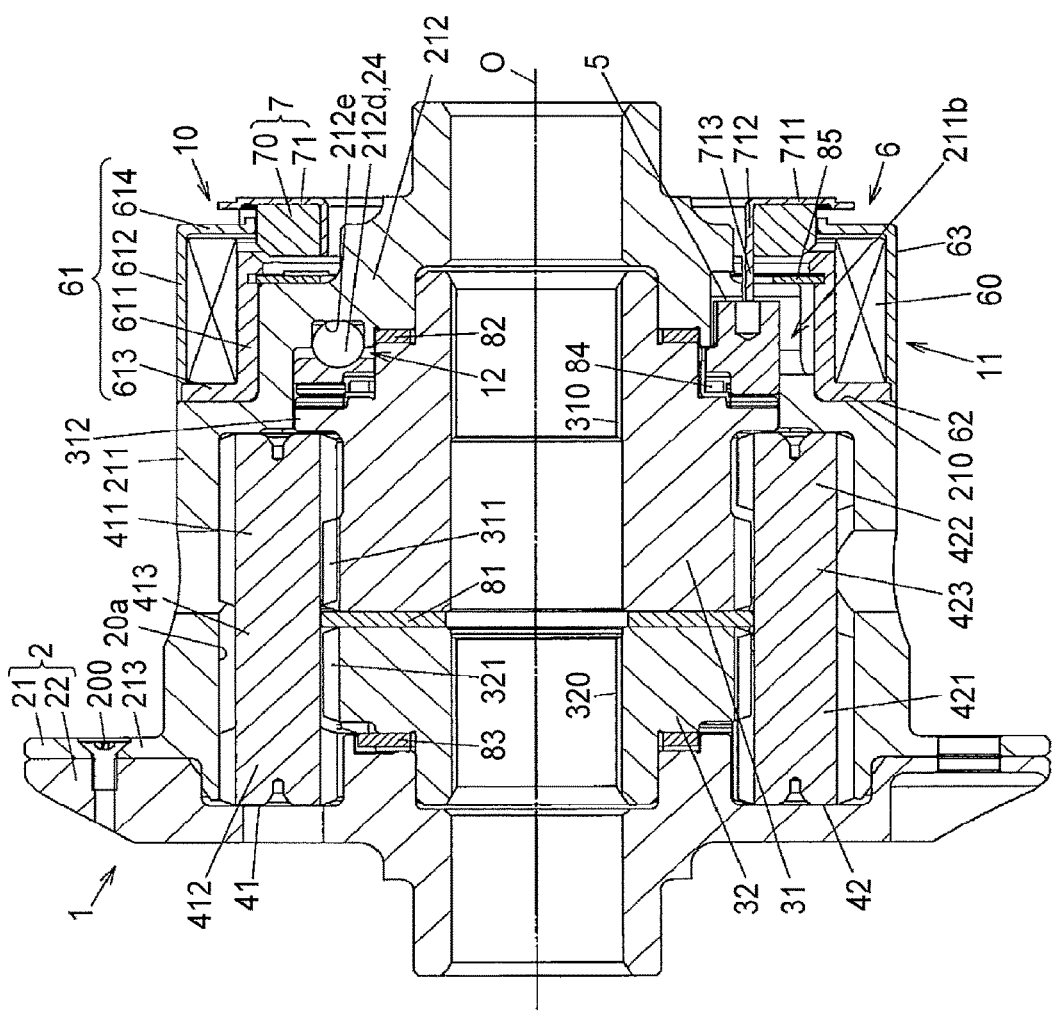
FIG. 1 is a sectional view illustrating an exemplary configuration of a differential gear according to an embodiment of the present invention.
Figure 2:
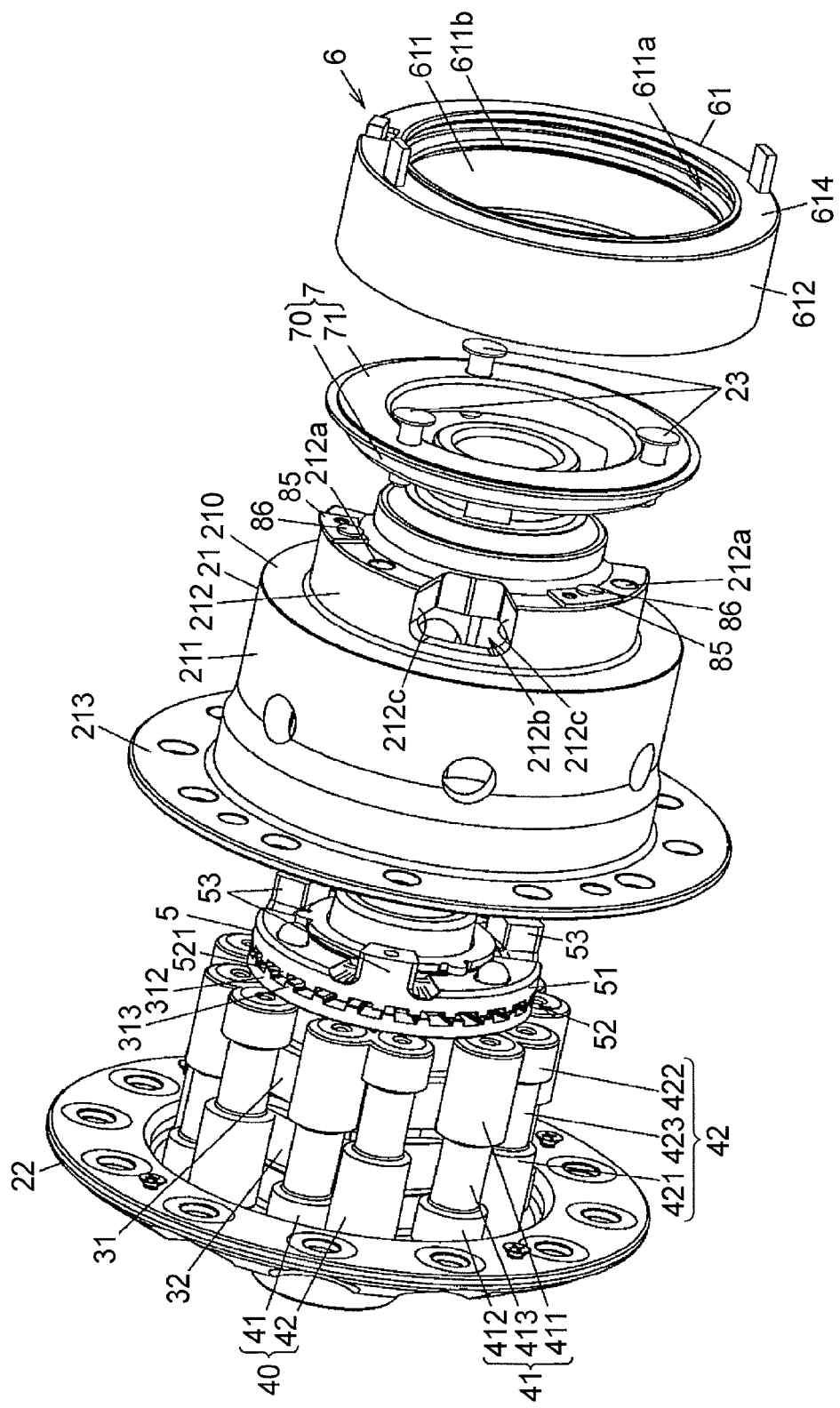
FIG. 2 is an exploded perspective view of the differential gear.
Figure 3B:
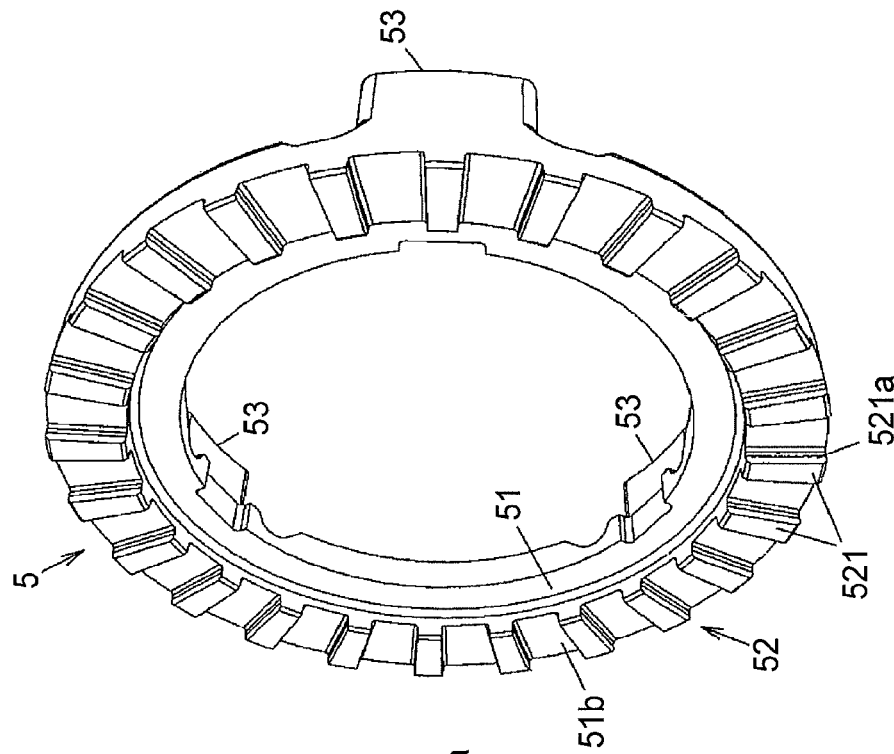
FIG. 3B is a perspective view of the clutch member constituting the pressing mechanism of the differential gear.
Figure 3A:
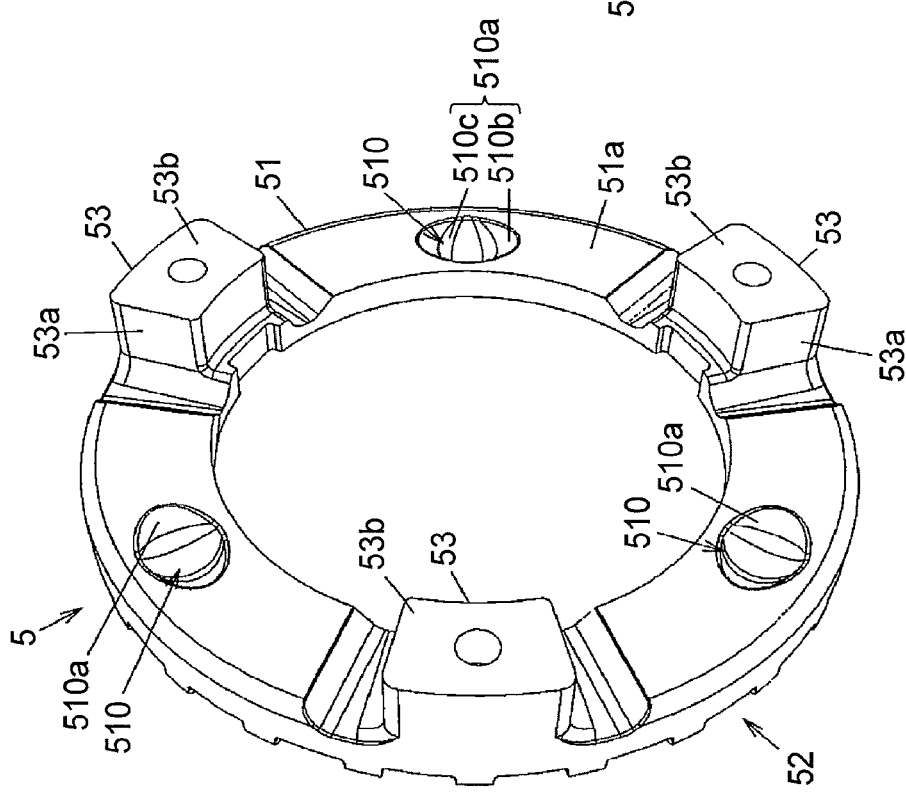
FIG. 3A is a perspective view of a clutch member constituting a pressing mechanism of the differential gear.
Figure 4A:
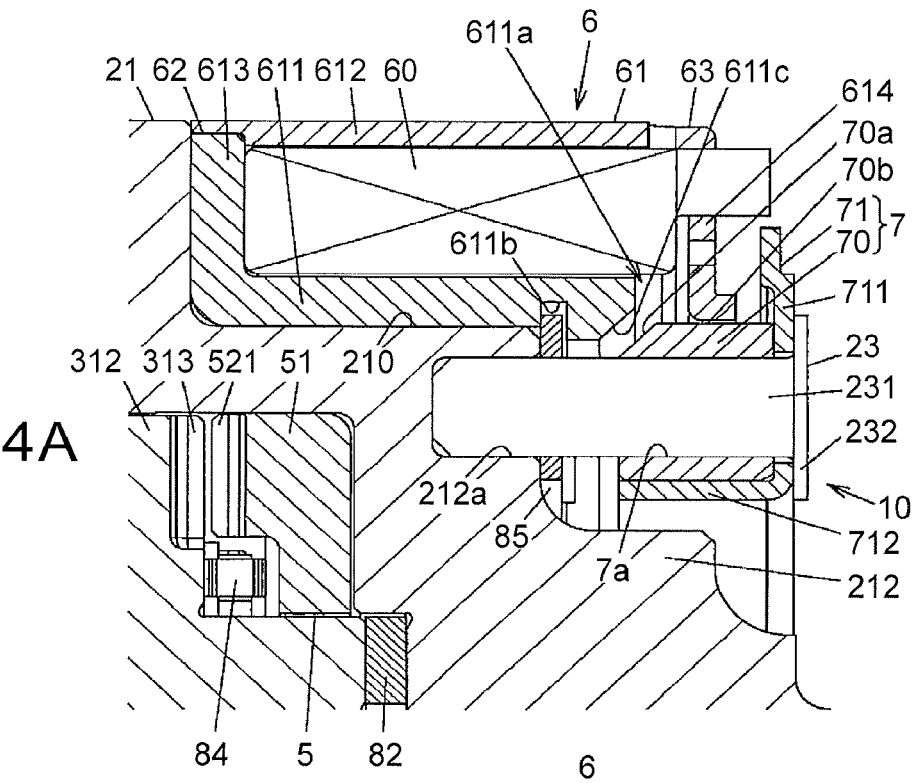
FIG. 4A is a sectional view illustrating a part of the differential gear in an enlarged manner.
Figure 4B:
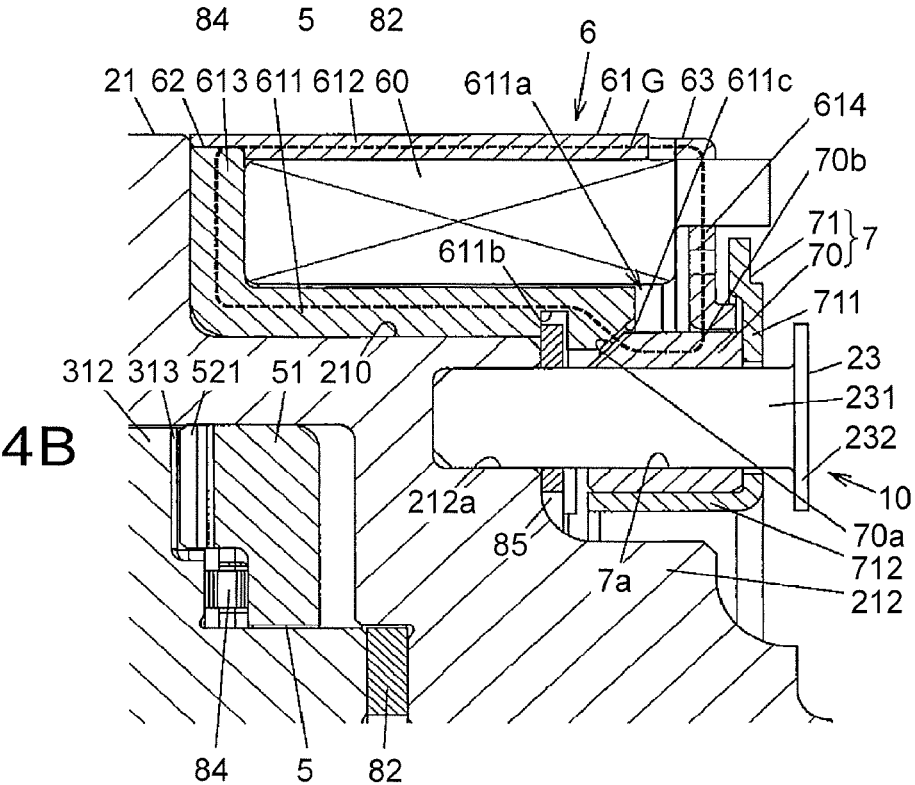
FIG. 4B is a sectional view illustrating a part of the differential gear in an enlarged manner.

FIG. 1 is a sectional view illustrating an exemplary configuration of a differential gear according to the embodiment of the present invention. FIG. 2 is an exploded perspective view of the differential gear. FIGS. 3A and 3B are perspective views of a clutch member constituting a pressing mechanism of the differential gear. FIGS. 4A and 4B are sectional views each illustrating a part of the differential gear in an enlarged manner.

The differential gear 1 is used to distribute a driving force of a drive source for a vehicle while a differential action between a pair of output shafts is allowed. The drive source is constituted by an engine or an electric motor. More specifically, the differential gear 1 according to the present embodiment is used as a differential device for distributing a driving force of the drive source to right and left wheels, for example, and distributes the driving force input therein to right and left drive shafts as the pair of output shafts. Note that, in the following description, a right side and a left side of FIG. 1 may be just referred to as the "right side" and the "left side" for convenience, but the "right side" and the "left side" herein do not necessarily limit right and left in a vehicle width direction in a state where the differential gear is provided in the vehicle.

The differential gear 1 includes: a differential case 2; a first side gear 31 and a second side gear 32 stored in the differential case 2; a plurality of (five in the present embodiment) of pinion gear sets 40 each configured such that a first pinion gear 41 and a second pinion gear 42 are meshed with each other; a clutch member 5 that can transmit a torque between the differential case 2 and the first side gear 31; and a pressing mechanism 10 for giving a pushing pressure to the clutch member 5. The differential case 2, the first side gear 31, the clutch member 5, and the pressing mechanism 10 constitute a dog clutch 11.

The first side gear 31 is placed on the right side and the second side gear 32 is placed on the left side. The first side gear 31 and the second side gear 32 have a cylindrical shape. A spline portion 310 to which one output shaft is connected in a relatively non-rotatable manner is provided on an inner peripheral surface of the first side gear 31, and a spline portion 320 to which the other output shaft is connected in a relatively non-rotatable manner is provided on an inner peripheral surface of the second side gear 32.

The differential case 2, the first side gear 31, and the second side gear 32 are placed rotatable relative to each other around a common rotation axis O. Hereinafter, a direction parallel to the rotation axis O is referred to as an axial direction.

The differential case 2 functions as an input rotational member into which the driving force of the drive source is input, and the first side gear 31 and the second side gear 32 function as a first output gear and a second output gear, respectively. A plurality of holding holes 20 for rotatably holding the first pinion gear 41 and the second pinion gear 42 of each pinion gear set 40 is provided in the differential case 2. The first pinion gear 41 and the second pinion gear 42 revolve around the rotation axis O and are rotatable in corresponding holding holes 20 with their respective central axes being taken as their rotation axes.

The first side gear 31 and the second side gear 32 have a common outside diameter, and gear wheel portions 311, 321 constituted by a plurality of helical teeth are provided on respective outer peripheral surfaces. A center washer 81 is placed between the first side gear 31 and the second side gear 32. Further, a side washer 82 is placed on the right side of the first side gear 31, and a side washer 83 is placed on the left side of the second side gear 32.

The first pinion gear 41 integrally includes a long gear wheel portion 411, a short gear wheel portion 412, and a connection portion 413 for connecting the long gear wheel portion 411 with the short gear wheel portion 412 in the axial direction. Similarly, the second pinion gear 42 integrally includes a long gear wheel portion 421, a short gear wheel portion 422, and a connection portion 423 for connecting the long gear wheel portion 421 with the short gear wheel portion 422 in the axial direction.

The first pinion gear 41 is configured such that: the long gear wheel portion 411 meshes with the gear wheel portion 311 of the first side gear 31 and the short gear wheel portion 422 of the second pinion gear 42; and the short gear wheel portion 412 meshes with the long gear wheel portion 421 of the second pinion gear 42. The second pinion gear 42 is configured such that: the long gear wheel portion 421 meshes with the gear wheel portion 321 of the second side gear 32 and the short gear wheel portion 412 of the first pinion gear 41; and the short gear wheel portion 422 meshes with the long gear wheel portion 411 of the first pinion gear 41. Note that FIG. 2 does not illustrate the helical teeth of these gear wheel portions.

In a case where the first side gear 31 and the second side gear 32 rotate at the same speed, the first pinion gear 41 and the second pinion gear 42 revolve together with the differential case 2 without rotating in respective holding holes 20. Further, in a case where the first side gear 31 and the second side gear 32 have different rotation speeds at the time of turning or the like of the vehicle, for example, the first pinion gear 41 and the second pinion gear 42 revolve while rotating in the respective holding holes 20. Hereby, a driving force input into the differential case 2 is distributed while a differential action between the first side gear 31 and the second side gear 32 is allowed. Note that the differential case 2 is an example of a "first rotational member" of the present invention, the first side gear 31 is an example of a "second rotational member" of the present invention, and the second side gear 32 is an example of a "third rotational member" of the present invention.

The clutch member 5 moves in the axial direction between a connecting position where the differential case 2 is connected to the first side gear 31 in a relatively non-rotatable manner and a non-connecting position where the differential case 2 and the first side gear 31 are allowed to rotate relative to each other. FIG. 4A illustrates a state where the clutch member 5 is placed at the non-connecting position, and FIG. 4B illustrates a state where the clutch member 5 is placed at the connecting position.

When the clutch member 5 is placed at the connecting position, a differential action between the differential case 2 and the first side gear 31 is restricted, so that the first pinion gear 41 and the second pinion gear 42 cannot rotate and a differential action between the differential case 2 and the second side gear 32 is also restricted. The clutch member 5 is biased toward the non-connecting position by a return spring 84 placed between the clutch member 5 and the first side gear 31.

The pressing mechanism 10 includes an electromagnet 6 for generating an electro-magnetic force, and a plunger 7 moving in the axial direction by a magnetic force of the electromagnet 6 so as to press and move the clutch member 5 in the axial direction. The electromagnet 6 includes a cylindrical electromagnetic coil 60, and a yoke 61 serving as a magnetic path of a magnetic flux generated by current application to the electromagnetic coil 60. The electromagnetic coil 60 generates a magnetic force to axially move the clutch member 5 by current application.

The yoke 61 includes: an inner ring portion 611 opposed to an inner peripheral surface of the electromagnetic coil 60; an outer ring portion 612 opposed to an outer peripheral surface of the electromagnetic coil 60; and first and second axial end portions 613, 614 opposed to respective axial end surfaces of the electromagnetic coil 60.

The first axial end portion 613 is opposed to a left end portion of the electromagnetic coil 60, and the second axial end portion 614 is opposed to a right end portion of the electromagnetic coil 60. In the present embodiment, the yoke 61 is constituted by an inner member 62 having the inner ring portion 611 and the first axial end portion 613, and an outer member 63 having the outer ring portion 612 and the second axial end portion 614. The inner member 62 and the outer member 63 are integrated by welding.

A discontinuous portion 611a where the magnetic path of the magnetic flux of the electromagnetic coil 60 becomes discontinuous is provided in the inner ring portion 611 of the yoke 61 along a circumferential direction. In the present embodiment, an axial length of the inner ring portion 611 of the yoke 61 is shorter than an axial length of the outer ring portion 612, and a gap provided between an axial end portion of the inner ring portion 611 and the second axial end portion 614 serves as the discontinuous portion 611a.

Further, a cut 611b provided in a radial direction is provided on an inner peripheral surface of the inner ring portion 611 on a first-axial-end-portion-613 side relative to the discontinuous portion 611a. Outer peripheral ends of a plurality of (three in the present embodiment mode) fan-shaped fixing plates 85 made of a nonmagnetic material are fitted to the cut 611b. In FIG. 2, two fixing plates 85 among them are illustrated. The fixing plate 85 is fixed to the differential case 2 by a pin 86. An axial position of the yoke 61 relative to the differential case 2 is fixed such that the fixing plates 85 are fitted to the cut 611b.

The plunger 7 includes an annular magnetic material core 70 made of a soft magnetic material, and a pressing member 71 made of a nonmagnetic material and configured to move in the axial direction integrally with the magnetic material core 70 so as to press the clutch member 5. The magnetic material core 70 is axially opposed to at least one end portion out of both end portions of the yoke 61 across the discontinuous portion 611a. In the present embodiment, part of an outer peripheral side of the magnetic material core 70 is axially opposed to an end portion of the inner ring portion 611 of the yoke 61 on a second-axial-end-portion-614 side.

More specifically, an inclined surface 70*a* inclined relative to the axial direction is provided in a part of the outer peripheral side of the left end portion of the magnetic material core 70, and an inclined surface 611*c* inclined relative to the axial direction so as to be parallel to the inclined surface 70*a* of the magnetic material core 70 is provided in an axial end portion of the inner ring portion 611 of the yoke 61 on a discontinuous-portion-611*a* side. The inclined surface 70*a* of the magnetic material core 70 is axially opposed to the inclined surface 611*c* of the inner ring portion 611 of the yoke 61. Further, the outer peripheral surface 70*b* of the magnetic material core 70 is opposed to an end portion of the second axial end portion 614 of the yoke 61 on the inner peripheral side.

The pressing member 71 includes: an annular plate portion 711 opposed to an axial end surface of the magnetic material core 70; a cylindrical plate portion 712 opposed to an inner peripheral surface of the magnetic material core 70; and a plurality of (three in the present embodiment) extending portions 713 axially extended from the cylindrical plate portion 712 and abutting with axial end surfaces (distal surfaces 53*b* of the after-mentioned engageable portions 53) of the clutch member 5 so as to press the clutch member 5.

The differential case 2 includes: a first case member 21 and a second case member 22 fixed to each other by a plurality of screws 200; and a plurality of (three in the present invention) pillar-shaped guide members 23 fixed to the first case member 21 so as to axially guide the plunger 7. The plunger 7 is movable in the axial direction relative to the differential case 2 by being guided by the guide members 23.

The guide member 23 is a nonmagnetic material made of austenitic stainless steel or aluminum, for example, and integrally includes a columnar shaft portion 231 and a falling-off prevention portion 232 provided in one end of the shaft portion 231, as illustrated in FIGS. 4A and 4B. Insertion holes 7*a* through which the shaft portions 231 of the guide members 23 are passed are provided at a plurality of (three in the present embodiment) places in the plunger 7. The insertion holes 7*a* extend in the axial direction so as to axially penetrate through the magnetic material core 70 and the pressing member 71.

The shaft portion 231 of the guide member 23 has an outside diameter slightly smaller than an inside diameter of the insertion hole 7*a* of the plunger 7, and a longitudinal direction along its central axis is parallel to the rotation axis O. The falling-off prevention portion 232 has a discoid shape having an outside diameter larger than the inside diameter of the insertion hole 7*a* of the plunger 7, and abuts with an end of the plunger 7 on an opposite side to the clutch member 5 so as to prevent the plunger 7 from falling off.

The first case member 21 integrally includes: a cylindrical portion 211 having a cylindrical shape and holding the plurality of pinion gear sets 40 rotatably; a bottom portion 212 extending radially inward from one end of the cylindrical portion 211; and a flange portion 213 butted against the second case member 22. An annular recess 210 to which the electromagnet 6 is mounted is provided at a corner between the cylindrical portion 211 and the bottom portion 212.

The first side gear 31 and the second side gear 32 are placed inside the cylindrical portion 211. Further, the first case member 21 is made of metal having a magnetic permeability lower than the yoke 61, and a ring gear (not shown) is fixed to the flange portion 213. The differential case 2 rotates around the rotation axis O by the driving force transmitted from the ring gear. The ring gear is mounted to the differential case 2 from a bottom-portion-212 side of the first case member 21. At this time, the electromagnet 6 is stored in the annular recess 210, and an outside diameter of the electromagnet 6 is equal to an outside diameter of the cylindrical portion 211 of the first case member 21, so the ring gear can be mounted with the electromagnet 6 being fixed.

As illustrated in FIG. 2, in the bottom portion 212 of the first case member 21, a plurality of press-fitting holes 212*a* into which one ends of the shaft portions 231 of the guide members 23 are press-fitted, and a plurality of insertion holes 212*b* through which the extending portions 713 of the pressing members 71 are passed are provided. The insertion hole 212*b* axially penetrates through the bottom portion 212. In the present embodiment, three press-fitting holes 212*a* and three insertion holes 212*b* are provided at regular intervals in a circumferential direction of the bottom portion 212. FIG. 2 illustrates two press-fitting holes 212*a* and one insertion hole 212*b* among them.

When a current is applied to the electromagnetic coil 60, a magnetic flux is generated in a magnetic path G indicated by a broken line in FIG. 4B, and the plunger 7 is drawn to the inner ring portion 611 so that the inclined surface 70*a* of the magnetic material core 70 approaches the inclined surface 611*c* of the inner ring portion 611 of the yoke 61. Hereby, the magnetic material core 70 receives a magnetic force so that a tip end of the extending portion 713 of the pressing member 71 abuts with an axial end surface of the clutch member 5 so as to press the clutch member 5.

The clutch member 5 is placed inside the yoke 61 because an outermost diameter (a diameter of an outermost part) of the clutch member 5 is smaller than an inside diameter (a minimum diameter of the inner ring portion 611) of the yoke 61. Further, as illustrated in FIG. 3A and 3B, the clutch member 5 integrally includes: a circular plate portion 51 having an annular disk shape and including a plurality of bowl-shaped recessed portions 510 provided on one axial end surface 51*a*; a meshing portion 52 provided on the other axial end surface 51*b* of the circular plate portion 51, the other axial end surface 51*b* being axially opposed to the first side gear 31; and engageable portions 53 having a trapezoidal pillar shape and provided so as to axially project from the one axial end surface 51*a* of the circular plate portion 51.

The circular plate portion 51 is placed on a radially inner side of the annular recess 210 where the electromagnet 6 is mounted. The one axial end surface 51*a* of the circular plate portion 51 is axially opposed to the bottom portion 212 of the first case member 21. The engageable portion 53 is partially inserted into the insertion hole 212*b* provided in the bottom portion 212 of the first case member 21. A plurality of meshing teeth 521 projecting in the axial direction is provided in the meshing portion 52. The plurality of meshing teeth 521 is provided in a part, on the outer peripheral side, of the other axial end surface 51*b* of the circular plate portion 51, and the axial end surface 51*b* provided on an inner side relative to the meshing portion 52 is provided as a flat receiver surface that abuts with the return spring 84 so as to receive a biasing force toward the non-connecting position.

The first side gear 31 is configured such that a plurality of meshing teeth 313 meshing with the plurality of meshing teeth 521 of the clutch member 5 is provided in an annular wall portion 312 provided in a projecting manner on the outer peripheral side relative to the gear wheel portion 311.

When the clutch member 5 is pressed by the plunger 7 and moved in the axial direction, the plurality of meshing teeth 521 of the meshing portion 52 meshes with the plurality of meshing teeth 313 of the first side gear 31. That is, when the clutch member 5 moves toward the first side gear 31, the clutch member 5 and the first side gear 31 are connected to each other in a relatively non-rotatable manner by meshing between the plurality of meshing teeth 521, 313.

In the first case member 21, an engaged portion to which the engageable portion 53 of the clutch member 5 circumferentially engages is constituted by the insertion hole 212b. The engageable portion 53 of the clutch member 5 includes an abutting surface 53a that abuts with an inner surface 212c (see FIG. 2) of the insertion hole 212b so as to receive a torque from the first case member 21. The abutting surface 53a is an end surface of the engageable portion 53 in the circumferential direction. The abutting surface 53a of the engageable portion 53 and the inner surface 212c of the insertion hole 212b, with which the abutting surface 53a abuts, are flat surfaces parallel to the rotation axis O. When the clutch member 5 receives a torque from the first case member 21, the abutting surface 53a of the engageable portion 53 makes surface contact with the inner surface 212c of the insertion hole 212b.

Further, the distal surface 53b of the engageable portion 53 is provided as a pressed surface with which the tip end of the extending portion 713 of the pressing member 71 abuts. When a current is applied to the electromagnetic coil 60, the plunger 7 presses the clutch member 5 toward an annular-wall-portion-312 side of the first side gear 31 such that the extending portion 713 of the pressing member 71 abuts with the distal surface 53b of the engageable portion 53.

An inner surface 510a of the bowl-shaped recessed portion 510 is provided as a cam surface to generate an axial cam thrust by a relative rotation with respect to the first case member 21. In other words, in the clutch member 5, a part of an opposed surface (one axial end surface 51a) of the circular plate portion 51 to the bottom portion 212 of the first case member 21 is provided as a cam surface.

As illustrated in FIG. 1, a projection 212d that abuts with the inner surface 510a of the bowl-shaped recessed portion 510 is provided in the bottom portion 212 of the first case member 21 so as to project in the axial direction. In the present embodiment, the projection 212d is constituted by a sphere 24 fixed to the bottom portion 212. The sphere 24 is partially stored in an axial recess 212e provided in the bottom portion 212, so as to be held by the first case member 21. Note that the projection 212d may be provided integrally as a part of the bottom portion 212. Even in this case, it is desirable that a tip end of the projection 212d be spherical.

The insertion hole 212b of the bottom portion 212 has a circumferential width wider than a circumferential width of the engageable portion 53 of the clutch member 5, and the differential case 2 and the clutch member 5 are rotatable relative to each other within a predetermined angle range corresponding to a difference between the circumferential width of the insertion hole 212b and the circumferential width of the engageable portion 53. The inner surface 510a of the bowl-shaped recessed portion 510 is provided in the clutch member 5 over an angle range larger than this predetermined angle range. Hereby, even if the clutch member 5 rotates relative to the differential case 2, the tip end of the projection 212d (the sphere 24) is always stored in the bowl-shaped recessed portion 510 so as to be axially opposed to the inner surface 510a.

The projection 212d of the bottom portion 212 of the first case member 21 and the bowl-shaped recessed portion 510 of the circular plate portion 51 of the clutch member 5 constitute a cam mechanism 12 for generating an axial thrust to separate the clutch member 5 from the bottom portion 212. Referring now to FIG. 5A to 5C, an operation of the cam mechanism 12 will be described below.

FIGS. 5A to 5C are explanatory views schematically illustrating the operation of the cam mechanism 12 with a circumferential section of the clutch member 5, the bottom portion 212 of the first case member 21, and the annular wall portion 312 of the first side gear 31. In FIGS. 5A and 5B, a rotation direction of the first side gear 31 relative to the differential case 2 (the first case member 21) is indicated by an arrow A.

As illustrated in FIG. 5A, the inner surface 510a of the bowl-shaped recessed portion 510 is constituted by a first inclined surface 510b inclined toward one side in a circumferential direction of the clutch member 5, and a second inclined surface 510c inclined toward the other side in the circumferential direction of the clutch member 5. An inclination angle of the first inclined surface 510b to the circumferential direction of the clutch member 5 is the same as an inclination angle of the second inclined surface 510c.

The meshing tooth 521 of the clutch member 5 and the meshing tooth 313 of the first side gear 31 both have a trapezoidal section. A plurality of recessed portions 313a fitted to the meshing teeth 521 of the clutch member 5 is provided each between the meshing teeth 313 adjacent to each other in the circumferential direction. A tooth flank 521a of the meshing tooth 521 of the clutch member 5 and a tooth flank 313b of the meshing tooth 313 of the first side gear 31 are diagonally inclined relative to the circumferential direction of the clutch member 5 and the first side gear 31.

When an inclination angle (a cam angle) of the first inclined surface 510b and the second inclined surface 510c in the bowl-shaped recessed portion 510 of the clutch member 5 is assumed $\alpha$, an inclination angle of the tooth flank 521a of the meshing tooth 521 relative to the circumferential direction of the clutch member 5 is assumed $\beta$, and an inclination angle of the tooth flank 313b of the meshing tooth 313 relative to the circumferential direction of the first side gear 31 is assumed $\gamma$, 62 =$\gamma$ is established, and a is smaller than $\beta$ and $\beta$. Hereby, when the cam mechanism 12 is operated and the meshing teeth 521 of the clutch member 5 mesh with the meshing teeth 313 of the first side gear 31, a cam thrust of the cam mechanism 12 becomes larger than a meshing reaction force of the meshing teeth 521, 313, so that the clutch member 5 is not pushed back toward the bottom portion 212 of the first case member 21 by the meshing reaction force.

When no current is applied to the electromagnetic coil 60, the clutch member 5 is pressed against the bottom portion 212 of the first case member 21 by a biasing force of the return spring 84. This state is illustrated in FIG. 5A. As illustrated in FIG. 5A, the projection 212d of the bottom portion 212 abuts with a backmost part of the bowl-shaped recessed portion 510, and the meshing teeth 521 of the clutch member 5 do not mesh with the meshing teeth 313 of the first side gear 31. In this state, the differential case 2 is rotatable relative to the first side gear 31, so a torque input into the differential case 2 is distributed while a differential action between the first side gear 31 and the second side gear 32 is allowed.

When a current is supplied to the electromagnetic coil 60, the pressing member 71 of the plunger 7 presses the clutch member 5, and after that, the cam mechanism 12 operates so that the clutch member 5 meshes with the first side gear 31.

FIG. 5B illustrates a state at the time when the meshing starts, and FIG. 5C illustrates a state where the meshing is completed.

As illustrated in FIG. 5B, when a current is applied to the electromagnetic coil 60 and the clutch member 5 is pressed by the pressing member 71 of the plunger 7, respective tip ends of the meshing teeth 521 of the clutch member 5 and the meshing teeth 313 of the first side gear 31 mesh with each other. Due to the meshing, the clutch member 5 rotates following the first side gear 31 so as to rotate relative to the differential case 2, so that the projection 212d of the bottom portion 212 slides on the first inclined surface 510b or the second inclined surface 510c of the bowl-shaped recessed portion 510.

FIG. 5B illustrates a case where the projection 212d of the bottom portion 212 slides on the first inclined surface 510b of the bowl-shaped recessed portion 510. Due to this sliding, a part with which the projection 212d of the bottom portion 212 abuts gradually moves to a shallow part of the bowl-shaped recessed portion 510, so that the clutch member 5 moves toward the first side gear 31 by a cam thrust. Hereby, a depth of the meshing between the meshing teeth 521 of the clutch member 5 and the meshing teeth 313 of the first side gear 31 (a distance of an axial overlap between the meshing teeth 521, 313) d1 is gradually deepened.

A relative rotation of the clutch member 5 to the differential case 2 is restricted such that the abutting surface 53a of the engageable portion 53 of the clutch member 5 makes contact with the inner surface 212c of the insertion hole 212b in the first case member 21. That is, as illustrated in FIG. 5C, when the abutting surface 53a of the engageable portion 53 of the clutch member 5 abuts with the inner surface 212c of the insertion hole 212b, the relative rotation of the clutch member 5 to the differential case 2 stops, so that the axial movement of the clutch member 5 to the differential case 2 also stops.

At this time, a gap S1 with an axial dimension of d2 is provided between a bottom face 313c of the recessed portion 313a between the meshing teeth 313 of the first side gear 31 and a distal surface 521b of the meshing tooth 521 of the clutch member 5, as illustrated in FIG. 5C. That is, even if the clutch member 5 rotates relative to the differential case 2, the meshing teeth 521 of the clutch member 5 are not butted against the annular wall portion 312 of the first side gear 31, so that the clutch member 5 does not directly press the first side gear 31 in the axial direction due to the cam thrust of the cam mechanism 12. Further, a gap S2 is also provided between a distal surface 313d of the meshing tooth 313 of the first side gear 31 and the circular plate portion 51 of the clutch member 5.

In a state where the meshing between the meshing teeth 521 of the clutch member 5 and the meshing teeth 313 of the first side gear 31 is completed, the engageable portion 53 of the clutch member 5 engages with the insertion hole 212b of the first case member 21 so that the relative rotation between the differential case 2 and the clutch member 5 is restricted, and due to the meshing between the meshing teeth 521 of the clutch member 5 and the meshing teeth 313 of the first side gear 31, a relative rotation between the clutch member 5 and the first side gear 31 is restricted. Hereby, a relative rotation between the differential case 2 and the first side gear 31 is restricted, and a torque is transmitted from the differential case 2 to the first side gear 31 via the clutch member 5.

As such, when the clutch member 5 moves in a direction to mesh with the first side gear 31, the depth of the meshing with the first side gear 31 is deepened by the cam thrust and then the engageable portion 53 of the clutch member 5 engages with the insertion hole 212b of the first case member 21, so that the clutch member 5 receives a torque from the differential case 2.

Further, a differential action between the differential case 2 and the first side gear 31 is restricted, so that the first pinion gear 41 and the second pinion gear 42 cannot rotate and a differential action between the differential case 2 and the second side gear 32 is also restricted, thereby resulting in that a torque is transmitted to the second side gear 32 from the differential case 2 via the first pinion gear 41 and the second pinion gear 42.

As illustrated in FIG. 5C, when a cam thrust of the cam mechanism 12 is assumed Fc, a pressing force of the plunger 7 due to current application to the electromagnetic coil 60 is assumed Fp, a meshing reaction force between the meshing teeth 521 of the clutch member 5 and the meshing teeth 313 of the first side gear 31 is assumed Fd, and a biasing force of the return spring 84 is assumed Fr, if Fp>Fr is established, it is possible to shift from the state illustrated in FIG. 5A to the state illustrated in FIG. 5B. After that, the meshing between the meshing teeth 521 of the clutch member 5 and the meshing teeth 313 of the first side gear 31 is completed due to the cam thrust Fc of the cam mechanism 12.

When the meshing teeth 521 of the clutch member 5 mesh with the meshing teeth 313 of the first side gear 31, the meshing reaction force Fd is generated, but since the relationship of α<β, γ is established as has been described above, the meshing reaction force Fd is smaller than the cam thrust Fc. A condition to maintain the meshing between the meshing teeth 521 of the clutch member 5 and the meshing teeth 313 of the first side gear 31 is Fd+Fr<Fe+Fp.

Further, when the current application to the electromagnetic coil 60 is stopped, the clutch member 5 returns to the non-connecting position illustrated in FIG. 5A by the meshing reaction force Fd and the biasing force Fr of the return spring 84. A condition for this is Fd+Fr>Fe. That is, the inclination angle α of the first inclined surface 510b and the second inclined surface 510c in the bowl-shaped recessed portion 510 of the clutch member 5, the inclination angle β of the tooth flank 521a of the meshing tooth 521 of the clutch member 5, the inclination angle γ of the tooth flank 313b of the meshing tooth 313 of the first side gear 31, a magnetic force of the electromagnet 6, and a spring constant of the return spring 84 are set so as to satisfy an inequality of Fd+Fr<Fc+Fp and an inequality of Fd+Fr>Fe.

A main operation/working-effect to be provided by the present embodiment described above is as follows.

When the clutch member 5 moves in a direction to mesh with the first side gear 31, the depth of the meshing between the meshing teeth 521 of the clutch member 5 and the meshing teeth 313 of the first side gear 31 is deepened by the cam thrust of the cam mechanism 12, and then the engageable portion 53 of the clutch member 5 engages with the insertion hole 212b of the first case member 21, so that the clutch member 5 receives a torque from the differential case 2. On this account, the electromagnet 6 just gives the plunger 7 an electromagnetic force enough to move the clutch member 5 in the axial direction against the biasing force of the return spring 84, thereby making it possible to restrain upsizing of the differential gear 1 and an increase in power consumption.

When the meshing between the meshing teeth 521 of the clutch member 5 and the meshing teeth 313 of the first side gear 31 is completed, a gap s is provided between the bottom face 313c of the recessed portion 313a between the meshing teeth 313 of the first side gear 31 and the distal surface 521b of the meshing tooth 521 of the clutch member 5. Hereby, the clutch member 5 does not press the first side gear 31 in the axial direction due to the cam thrust of the cam mechanism 12, so that it is possible to restrain necessary rigidity of the differential case 2 to support the first side gear 31, thereby making it possible to achieve downsizing and light-weighting of the differential case 2.

The clutch member 5 receives a torque from the differential case 2 such that the engageable portion 53 engages with the insertion hole 212*b* of the first case member 21. Accordingly, it is possible to simplify a torque transmission structure from the differential case 2 to the clutch member 5 and to restrain a relative rotation between the differential case 2 and the clutch member 5 within a predetermined angle range. Further, the abutting surface 53*a* of the engageable portion 53 of the clutch member 5 and the inner surface 212*c* of the insertion hole 212*b* of the first case member 21 arc surfaces parallel to the rotation axis O, and the abutting surface 53*a* of the engageable portion 53 makes surface contact with the inner surface 212*c* of the insertion hole 212*b*. This relaxes stress concentration at the time of torque transmission.

Since the projection 212*d* of the bottom portion 212 of the first case member 21 is constituted by the sphere 24 stored in the recess 212*e* of the bottom portion 212, machining of the first case member 21 is easily performed.

The present invention has been described with reference to the above embodiment, but the present invention is not limited to this embodiment, and various modifications can be made appropriately within a range which does not deviate from the gist of the present invention. For example, the above embodiment deals with a case where the present invention is applied to a parallel-axis differential gear in which respective rotation axes of a pair of side gears (the first side gear 31 and the second side gear 32) and a pair of pinion gears (the first pinion gear 41 and the second pinion gear 42) are parallel to each other. However, the present invention is not limited to this, and the present invention is also applicable to a differential gear configured such that a pair of side gears and a pair of pinion gears mesh with each other with their gear axes being at right angles.

What is claimed is:

1. A dog clutch comprising:
a first rotational member;
a second rotational member placed rotatable relative to the first rotational member around a common rotation axis;
a clutch member configured to transmit a torque between the first rotational member and the second rotational member; and
a pressing mechanism configured to press and move the clutch member in a direction of the rotation axis, wherein
the clutch member includes a meshing portion meshing with the second rotational member due to a movement in the direction of the rotation axis, an engageable portion circumferentially engaging with an engaged portion provided in the first rotational member, and a cam surface configured to generate a cam thrust in the direction of the rotation axis by a relative rotation with respect to the first rotational member;
when the clutch member moves in a direction to mesh with the second rotational member, a depth of meshing with the second rotational member is deepened by the cam thrust, and then the engageable portion engages with the engaged portion, so that the clutch member receives a torque from the first rotational member; and
the cam surface is a recessed portion that abuts with a projection on a bottom portion of the first rotational member.

2. The dog clutch according to claim 1, wherein:
a plurality of meshing teeth projecting in an axial direction parallel to the rotation axis is provided in the meshing portion of the clutch member;
a plurality of recessed portion to which the meshing teeth are fitted is provided in the second rotational member; and
when the engageable portion of the clutch member engages with the engaged portion of the first rotational member so as to receive the torque, a gap is provided between a distal surface of each of the meshing teeth and a bottom face of a corresponding one of the recessed portions.

3. The dog clutch according to claim 1, wherein:
the first rotational member and the clutch member are rotatable relative to each other within a predetermined angle range; and
the cam surface is provided in the clutch member over an angle range larger than the predetermined angle range.

4. The dog clutch according to claim 1, wherein:
the first rotational member is configured such that the engaged portion is constituted by an insertion hole into which the engageable portion of the clutch member is inserted; and
the engageable portion of the clutch member includes an abutting surface that abuts with an inner surface of the insertion hole so as to receive the torque from the first rotational member.

5. The dog clutch according to claim 4, wherein
the abutting surface of the engageable portion of the clutch member and the inner surface of the insertion hole of the first rotational member, with which the abutting surface abuts, are surfaces parallel to the rotation axis.

6. The dog clutch according to claim 4, wherein
the pressing mechanism includes a plunger configured to press the engageable portion of the clutch member.

7. A dog clutch comprising:
a first rotational member:
a second rotational member placed rotatable relative to the first rotational member around a common rotation axis;
a clutch member configured to transmit a torque between the first rotational member and the second rotational member; and
a pressing mechanism configured to press and move the clutch member in a direction of the rotation axis, wherein
the clutch member includes a meshing portion meshing with the second rotational member due to a movement in the direction of the rotation axis, an engageable portion circumferentially engaging with an engaged portion provided in the first rotational member, and a cam surface configured to generate a cam thrust in the direction of the rotation axis by a relative rotation with respect to the first rotational member;
when the clutch member moves in a direction to mesh with the second rotational member, a depth of meshing with the second rotational member is deepened by the cam thrust, and then the engageable portion engages with the engaged portion, so that the clutch member receives a torque from the first rotational member;
the first rotational member includes a cylindrical portion inside which the second rotational member is placed, and a bottom portion extending radially inward from one end of the cylindrical portion;

the clutch member is configured such that a part of an opposed surface of a circular plate portion to the bottom portion is provided as the cam surface, the circular plate portion having an annular disk shape; and a projection abutting with the cam surface is provided in the bottom portion.

8. The dog clutch according to claim 7, wherein the projection is a sphere fixed to the bottom portion.

9. The dog clutch according to claim 7, wherein the clutch member is configured such that the meshing portion is provided on a surface of the circular plate portion on an opposite side to a bottom-portion-side.

10. A differential gear comprising:

the dog clutch according to claim 1; and a third rotational member rotatable relative to the first rotational member and the second rotational member around the rotation axis, wherein:

in a state where the meshing portion of the clutch member does not mesh with the second rotational member, a torque input into the first rotational member is distributed to the second rotational member and the third rotational member while a differential action between the second rotational member and the third rotational member is allowed; and when the meshing portion of the clutch member meshes with the second rotational member, a differential action of the first rotational member with respect to the second rotational member and the third rotational member is restricted.

* * * * *